US012808436B2

(12) United States Patent
Gardner

(10) Patent No.: US 12,808,436 B2
(45) Date of Patent: *Nov. 24, 2026

(54) SELECTIVELY DENSIFIED MEMBRANE SEALANT AND PROCESS FOR MAKING SAME

(71) Applicant: W. L. Gore & Associates, Inc., Newark, DE (US)

(72) Inventor: John C. Gardner, Flagstaff, AZ (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/292,026

(22) Filed: Aug. 6, 2025

(65) Prior Publication Data

US 2025/0361936 A1 Nov. 27, 2025

Related U.S. Application Data

(63) Continuation of application No. 17/659,831, filed on Apr. 19, 2022, now Pat. No. 12,404,930.

(60) Provisional application No. 63/177,590, filed on Apr. 21, 2021.

(51) Int. Cl.
*F16J 15/10* (2006.01)
*F16J 15/02* (2006.01)

(52) U.S. Cl.
CPC ........... *F16J 15/104* (2013.01); *F16J 15/022* (2013.01); *F16J 15/102* (2013.01); *F16J 15/108* (2013.01)

(58) Field of Classification Search
CPC ........ F16J 15/104; F16J 15/022; F16J 15/102; F16J 15/108; F16J 15/10; F16J 15/14
See application file for complete search history.

(56) References Cited

U.S. PATENT DOCUMENTS

| | | | | |
|---|---|---|---|---|
| 12,404,930 | B2 | 9/2025 | Gardner | |
| 2002/0031628 | A1 | 3/2002 | Zumbrum et al. | |
| 2004/0175571 | A1* | 9/2004 | Buerger | F16J 15/104 428/688 |
| 2007/0040338 | A1* | 2/2007 | Dove | B32B 7/10 277/626 |
| 2008/0280040 | A1 | 11/2008 | Barrall et al. | |
| 2012/0061923 | A1* | 3/2012 | Farzana | F16J 15/104 277/654 |
| 2014/0304974 | A1 | 10/2014 | Mineif | |
| 2022/0341495 | A1 | 10/2022 | Gardner | |

FOREIGN PATENT DOCUMENTS

| | | | |
|---|---|---|---|
| DE | 69932595 | T2 | 8/2007 |
| DE | 102009010371 | A1 | 9/2010 |
| WO | 01/27501 | A1 | 4/2001 |

* cited by examiner

*Primary Examiner* — Gilbert Y Lee

(57) ABSTRACT

A selectively densified composite sealant includes a porous layer having a first major surface and an opposing second major surface. The porous layer is formed of a porous membrane and having alternating first densified portions and second undensified portions that form respective valleys and peaks in the porous layer. An elastomeric layer is disposed on the first major planar surface of the porous layer and is formed of an elastomeric material that fills the valleys between the undensified portions.

34 Claims, 8 Drawing Sheets

SELECTIVELY DENSIFIED MEMBRANE SEALANT AND PROCESS FOR MAKING SAME

TECHNICAL FIELD

The present disclosure generally relates to composite sealants. More specifically, the disclosure relates to selectively densified membrane composite sealants for sealing connections.

BACKGROUND

Many industries employ sealants to prevent liquid intrusion between physical elements in products or structures. Common sealants include paints, caulks, polymeric materials, O-rings and gaskets or the like, and vary according to the specific application. The aircraft industry, in particular, employs sealants for protecting various interfaces in order to prevent corrosion and surface degradation, e.g., due to water or chemical intrusion.

One of the materials often employed by the aircraft industry is a 2 part liquid polysulfide material, used to increase the protection of various interfaces from corrosion and surface degradation. This practice can be used to protect assemblies such as installed brackets along the airframe. For example, a material (such as aluminum, fiber reinforced plastic, or carbon composite) can be attached to a section of an aircraft frame using bolts or rivets. An installer can apply liquid sealant between the connected parts, and then affix the bracket to the frame using fasteners. As the fasteners are tightened, the pressure from the fastener heads may spread the sealant. The sealant typically must be allowed to cure at room temperature for long periods of time, e.g., 72 hours or more, depending on the sealant grade. This process is time consuming, requires careful mixing and application techniques, and typically requires personal protective equipment (PPE) and ventilation due to the volatile organic compounds (VOCs) that are released in the process.

Traditional designs that make use of "dry sealing" materials, such as O-rings, gaskets, or other pliable structures, require precise placement and pressure to be effective, and can suffer from degradation over time due to chemical attack. Dry sealing materials that can resist chemical attack often cannot perform at the required temperature ranges and often suffer deficiencies, particularly at cold operating temperatures and variable levels of conformability. Liquid sealants, which can conform more easily to specific interface geometries, suffer from deficiencies of challenging installation procedures, and cannot readily be removed once adjusted without breaking the seal. Further, polysulfide liquid sealants alone often cannot be effective after prolonged exposure to certain harsh chemistries like phosphate ester hydraulic fluid. Accordingly, the need exists for sealing technologies that can operate in a variety of interface profiles without sacrificing durability, performance at a wide range of temperatures or resistance weather and/or chemical attack.

SUMMARY

The present disclosure relates to a selectively densified composite sealant. The selectively densified composite sealant includes a porous layer and at least one elastomeric layer. The porous layer has a first major surface and an opposing second major surface, and includes a porous membrane. The porous layer may have alternating densified portions and undensified portions. The alternating densified portions and undensified portions may form respective valleys and peaks in at least one of the first major surface and/or the second major surface of the porous layer. The undensified portions may be disconnected from each other and separated by the densified portions. The densified portions may be generated by increasing the density of the porous layer. However, the porous layer may not be completely densified.

At least one of the first and second major surfaces may define respective valleys and peaks of the porous layer. The other of the at least one of the first and second major surfaces may be flat or may also define respective valleys and peaks of the porous layer. In embodiments in which both the first major surface and the second major surface define respective valleys and peaks, the peaks of the first major planar surface may be disposed substantially above the corresponding peaks of the second major planar surface of the porous layer. Similarly, the valleys of the first major planar surface may be disposed substantially above the corresponding valleys of the second major planar surface of the porous layer. In embodiments in which both the first major surface and the second major surface define respective valleys and peaks, the respective valleys and peaks on the first major surface may be disposed on different XY locations to the valleys on the second major surface. Alternatively, in embodiments in which both the first major surface and the second major surface define peaks and valleys, the valleys of the first major surface may be disposed substantially above the peaks of the second major surface. The densified first portions of the porous layer may be continuous along a Z (thickness) axis of the porous layer.

The at least one elastomeric layer may be disposed on the first major surface. The at least one elastomeric layer may comprise a first elastomeric layer. The at least one elastomeric layer may be formed of a first elastomeric material. The at least one elastomeric layer may fill the valleys of the densified portions of the porous layer. The at least one elastomeric layer may fill the valleys of the densified portions of the first major surface of the porous layer. The composite sealant may include a second elastomeric layer disposed on the second major surface. The at least one elastomeric layer may comprise a second elastomeric layer. The at least one elastomeric layer may be formed of a second elastomeric material. The at least one elastomeric layer may fill the valleys of the densified portions of the porous layer. The at least one elastomeric layer may fill the valleys of the densified portions of the second major surface of the porous layer.

The first and second elastomeric materials may be the same elastomeric material, or they may comprise different elastomeric materials. The first and/or second elastomeric material may be chemically inert with respect to at least one of the possible challenge fluids (e.g. water, jet fuel, common solvents such as organic solvents, de-icing fluid). The first and/or second elastomeric material may not become wet when exposed to fluid. The elastomeric material may be any suitable elastomer that can be formed to a complex surface (e.g., a grooved or patterned surface). The elastomer can be a polymer that is configured to be deposited as a liquid, i.e. poured, molded, printed, or otherwise deposited, and then cured to retain its shape. Alternatively, the elastomer may be deposited by heat treatment, e.g. melting and deposition on the porous membrane. When set and cured, the elastomer fills in the valleys between undensified regions of the porous membrane, while the porous membrane is operable to reversibly compress under load to provide sealing capabilities with a high working range, i.e., being capable of sealing a gap in an interface at a wide range of clamping pressures or between uneven surfaces. In embodiments the elastomeric material comprises an elastomeric matrix comprising one or more of a silicone, fluorosilicone, or a perfluoropolyether elastomer. The elastomer may comprise a fluoroelastomer.

In embodiments in which the second major surface defines valleys and peaks of the porous layer, the second elastomeric layer may fill the valleys of the second major surface of the porous layer. The composite sealant may include a first elastomeric layer disposed on the first major surface and a second elastomeric layer disposed on the second major surface. The first and second elastomeric materials may optionally be the same elastomeric material.

Providing a porous material comprising a densified and undensified portions and at least one elastomeric layer may provide liquid seal upon compression. The undensified portions of the porous material may become wetted upon fluid challenge (i.e. when exposed to a fluid) when not imbibed with elastomeric material. When the porous material is substantially densified, the substantially densified porous material may not become wetted upon fluid challenge (even if the substantially densified porous material is not imbibed with elastomeric material). The porous material may not become wetted at the densified portions. Additionally, the at least one elastomeric layer may prevent fluid ingress into the selectively densified composite sealant upon fluid challenge.

In the Z axis (thickness) of the selectively densified composite sealant, the composite comprises at least one elastomer layer and the densified region. In some embodiments, in the Z axis (thickness) of the selectively densified composite sealant, the composite comprises at least two elastomeric layers sandwiching the porous layer. Without wishing to be bound by theory, the section of the composite comprising densified portions of the porous layer with elastomeric material filling the valleys of the densified portions of the porous material provides fluid ingress protection (e.g. at a coupling point) upon compression. The undensified portions of the selectively densified composite sealant may render the sealant compliant and allow for a degree of compression under pressure (e.g. at a joint or coupling point). The geometry of the densified portions along with the undensified portions between the densified portions may enable the composite sealant to still behave softly and compliant, while providing liquid seal under pressure.

The porous layer may be a porous polymer or fluoropolymer, e.g., a porous layer such as an expanded polytetrafluoroethylene (ePTFE) membrane, a polypropylene membrane, or an expanded polyethylene (ePE) membrane. The selectively densified composite sealant may include a porous layer comprising expanded polytetrafluoroethylene (ePTFE). The selectively densified composite sealant may include a porous layer consisting essentially of expanded polytetrafluoroethylene (ePTFE). In embodiments including a porous layer comprising ePTFE, the ePTFE layer may be manufactured in accordance with the teachings of U.S. Pat. No. 3,953,566. In embodiments including a porous layer comprising ePE layer, the ePE layer may be manufactured in accordance with U.S. Pat. No. 9,926,416.

The selectively densified composite sealant may further include a barrier layer disposed between the porous layer and at least one of the first elastomeric layer and/or the second elastomeric layer. The barrier layer may be configured to inhibit ingress of elastomeric material from the first elastomeric layer and/or the second elastomeric layer into the porous layer. The barrier layer may allow partial ingress (i.e. imbibement) of elastomeric material from the first elastomeric layer and/or the second elastomeric layer into the porous layer. The barrier layer may completely prevent ingress of elastomeric material from the first elastomeric layer and/or the second elastomeric layer into the porous layer. The elastomeric material of the at least one elastomeric layer may partially penetrate the porous layer, in particular the un-densified portion, particularly in embodiments in which the selectively densified composite sealant does not comprise a barrier layer. The degree of imbibement of the elastomeric material into the porous layer in embodiments comprising a barrier level therebetween may be tuned with the type of barrier layer material and the viscosity and type of elastomer, as well as other processing variables of the selectively densified composite sealant. The barrier layer may comprise any suitable non-wettable film or membrane such as, but not limited to, a polymer or fluoropolymer film. The barrier layer may comprise or consist essentially of a compression-densified ePTFE film, a non-wettable ePTFE film, a fluorinated ethylene propylene FEP, a non-wettable ePE film, or the like. In preferred embodiments, the barrier layer may comprise a non-wettable ePTFE layer. In embodiments in which the selectively densified composite sealant does not comprise a barrier layer, the elastomeric material of the at least one elastomeric layer may partially penetrate the porous layer (i.e. the porous layer may become at least partially imbibed with the elastomeric material). In embodiments in which the selectively densified composite sealant does not comprise a barrier layer, the un-densified portions of the porous layer may become at least partially imbibed with the elastomeric material. Optionally, the undensified portions of the elastomeric material may become fully imbibed with the elastomeric material.

The first elastomeric material and/or the second elastomeric material can be formed of a single elastomeric layer or a plurality of elastomeric layers, (e.g. 2 layers, 3 layers, 4 layers, or more).

The selectively densified composite sealant may further comprise an adhesive in at least one of the first elastomeric layer and/or the second elastomeric layer. The adhesive may be applied discontinuously, (e.g. as discrete dots), or it may be applied as a continuous adhesive layer.

The porous layer of the composite sealant may have densified and undensified portions forming a repeating pattern. The repeating pattern may be any suitable pattern, including but not limited to a rectangular grid or a square grid, parallel lines, diamonds. The densified and undensified portions may define any shape, such as dots, squares, rectangles, triangles, diamonds, ovals, curved lines (e.g. wavy lines), and the like. Generally, the undensified portions are separated from one another along a length and width of the composite sealant by the densified portions.

The first and/or second major surfaces may define alternating densified and undensified portions forming respective valleys and peaks in a grid repeating pattern. The first and/or second major surface may define a first set of valleys forming substantially parallel lines and a second set of valleys forming substantially parallel lines, wherein the first set of valleys is substantially perpendicular to the second set of valleys. The other of the first or second major surfaces may be substantially flat, or it may define a corresponding grid pattern to the opposite major surface, optionally, the corresponding grid patterns on the first and second major surfaces may be aligned along a Z axis (thickness axis) of the porous layer. The repeating pattern may be a grid formed by applying pressure on the first or the second major surface in a pattern of a first set of substantially parallel lines and applying on the other (opposite) major surface a second set of substantially parallel lines, wherein the first set of substantially parallel lines is substantially perpendicular to the second set of substantially parallel lines. The first or the second major surface may define a first set of valleys forming substantially parallel lines and the other of the first or second major surfaces may define a second set of valleys forming substantially parallel lines, wherein the first set of valleys is substantially perpendicular to the second set of valleys.

The repeating pattern may be formed on only one of the first or second major surfaces or it may be formed on both the first and second major surfaces. For example, the repeating pattern may be a grid formed by applying pressure on the first or the second major surface in a pattern of a first set of substantially parallel lines and applying on the same major surface a second set of substantially parallel lines, wherein the first set of substantially parallel lines is substantially perpendicular to the second set of substantially parallel lines. The other of the first or second major surfaces may be substantially flat, or it may define a corresponding grid pattern to the opposite major surface, optionally, the corresponding grid patterns on the first and second major surfaces may be aligned along a Z axis (thickness axis) of the porous layer. The repeating pattern may be a grid formed by applying pressure on the first or the second major surface in a pattern of a first set of substantially parallel lines and applying on the other (opposite) major surface a second set of substantially parallel lines, wherein the first set of substantially parallel lines is substantially perpendicular to the second set of substantially parallel lines.

The porous layer of the composite sealant may have an initial thickness (i.e. when uncompressed or undensified) of from about 50 μm to about 2000 μm.

The porous layer may have a particular density. It has that density when it is completely uncompressed or not at all densified. That particular density may be increased by compression or densification. Compression or densification as used herein means the removal of air or reduction of thickness of the porous layer. This may be achieved by applying force, and/or it may be achieved by other means, such as the application and evaporation of particular liquids (e.g. isopropyl alcohol). The density of the polymer material of the porous layer as used herein means the density after the air is fully removed from the porous layer by compression or densification. In that case the porous layer is completely densified. In embodiments in which the porous layer comprises ePTFE, the density of the polymer material is 2.20 g/cm$^3$. This corresponds to the density of the remaining node and fibril structure, once the air is removed from the ePTFE layer. Undensified and densified portions as used herein means that these portions are partly densified, but to a greater or lesser degree in relation to one another and to complete densification or no densification at all. Undensified portions are less dense than densified portions. Undensified portions can be completely undensified/uncompressed or densified to a certain degree. They are of the same density or denser than the completely uncompressed porous layer. Densified portions are densified to a greater degree than undensified portions. They may be as dense as the completely densified porous layer. A method for determining whether the porous layer has been completely densified involves weighing the porous layer and diving the weight by the volume of the layer (thickness×length×breadth). For ePTFE porous layers, if the result is 2.20 g/cm$^3$, all of the air has been removed and the porous layer has been fully densified. If the result is not is 2.20 g/cm$^3$, then the porous layer has been partially densified and some air remains within the structure.

The undensified portions of the porous layer may have a density from about 1% to 90% of the density of the polymer material of the porous layer. The undensified portions of the porous layer may have a density from about 1% to 80%, or about 10% to about 70%, or about 20% to about 60%, or about 30% to about 50%, or about 1% to about 50%, or about 10% to about 50%, or about 20% to about 50%, or about 30% to about 50%, or about 40% to about 50%, or about 50% to about 90%, or about 60% to about 90%, or about 70% to about 90%, or about 80% to about 90% of the density of the polymer material of the porous layer The densified portions of the porous layer may have from about 30% to about 100% of the density of the polymer material of the porous layer. The densified portions of the porous layer may have from about 40% to about 100%, or from about 50% to about 100%, or from about 60% to about 100%, or from about 70% to about 100%, or from about 80% to about 100%, or from about 90% to about 100%, or from about 30% to about 50%, or from about 40% to about 50%, or from about 40% to about 60%, or from about 50% to about 70%, or from about 60% to about 80%, or from about 70% to about 90% of the density of the polymer material of the porous layer The porous layer may be a porous ePTFE layer. The ePTFE layer may have a density from about 0.02 g/cm$^3$ to about 1.98 g/cm$^3$. The ePTFE layer may have a density from about 0.02 g/cm$^3$ to about 1.90 g/cm$^3$, or from about 0.02 g/cm$^3$ to about 1.80 g/cm$^3$, or from about 0.02 g/cm$^3$ to about 1.70 g/cm$^3$, or from about 0.02 g/cm$^3$ to about 1.60 g/cm$^3$, or from about 0.02 g/cm$^3$ to about 1.50 g/cm$^3$, or from about 0.02 g/cm$^3$ to about 1.40 g/cm$^3$, or from about 0.02 g/cm$^3$ to about 1.30 g/cm$^3$, or from about 0.02 g/cm$^3$ to about 1.20 g/cm$^3$, or from about 0.02 g/cm$^3$ to about 1.10 g/cm$^3$, or from about 0.02 g/cm$^3$ to about 1.00 g/cm$^3$, or from about 0.02 g/cm$^3$ to about 0.90 g/cm$^3$, or from about 0.02 g/cm$^3$ to about 0.80 g/cm$^3$, or from about 0.02 g/cm$^3$ to about 0.70 g/cm$^3$, or from about 0.02 g/cm$^3$ to about 0.60 g/cm$^3$, or from about 0.02 g/cm$^3$ to about 0.50 g/cm$^3$, or from about 0.02 g/cm$^3$ to about 0.40 g/cm$^3$, or from about 0.02 g/cm$^3$ to about 0.30 g/cm$^3$, from about 0.02 g/cm$^3$ to about 0.20 g/cm$^3$, from about 0.02 g/cm$^3$ to about 0.10 g/cm$^3$. The ePTFE layer may have a density from about 0.10 g/cm$^3$ to about 0.90 g/cm$^3$, or from about 0.20 g/cm$^3$ to about 0.90 g/cm$^3$, or from about 0.30 g/cm$^3$ to about 0.90 g/cm$^3$, or from about 0.40 g/cm$^3$ to about 0.90 g/cm$^3$, or from about 0.50 g/cm$^3$ to about 0.90 g/cm$^3$, or from about 0.60 g/cm$^3$ to about 0.90 g/cm$^3$, or from about 0.70 g/cm$^3$ to about 0.90 g/cm$^3$, from about 0.80 g/cm$^3$ to about 0.90 g/cm$^3$. The ePTFE layer may have a density from about 0.10 g/cm$^3$ to about 0.50 g/cm$^3$, or from about 0.20 g/cm$^3$ to about 0.50 g/cm$^3$, or from about 0.30 g/cm$^3$ to about 0.50 g/cm$^3$, or from about 0.30 g/cm$^3$ to about 0.60 g/cm$^3$, or from about 0.40 g/cm$^3$ to about 0.60 g/cm$^3$, or from about 0.50 g/cm$^3$ to about 0.70 g/cm$^3$, or from about 0.50 g/cm$^3$ to about 0.70 g/cm$^3$, from about 0.60 g/cm$^3$ to about 0.80 g/cm$^3$, from about 0.70 g/cm$^3$ to about 0.80 g/cm$^3$, or from about 0.08 g/cm$^3$ to about 1.98 g/cm$^3$, or from about 0.06 g/cm$^3$ to about 1.70 g/cm$^3$, or from about 0.04 g/cm$^3$ to about 1.00 g/cm$^3$, or from about 1.00 g/cm$^3$ to about 1.90 g/cm$^3$, or from about 1.10 g/cm$^3$ to about 1.80 g/cm$^3$, or from about 1.20 g/cm$^3$ to about 1.60 g/cm$^3$, or from about 1.50 g/cm$^3$ to about 1.98 g/cm$^3$, or from about 1.60 g/cm$^3$ to about 1.80 g/cm$^3$, or from about 1.30 g/cm$^3$ to about 1.70 g/cm$^3$, or from about 1.10 g/cm$^3$ to about 1.50 g/cm$^3$, or from about 1.20 $g/cm^3$ to about 1.60 $g/cm^3$, or from about 1.40 $g/cm^3$ to about 1.98 $g/cm^3$.

The sealant may include densified portions forming a grid of compressed porous material (e.g. compressed or densified ePTFE) having a density from about 0.66 $g/cm^3$ to about 2.20 $g/cm^3$. The densified portions may have a density from about 0.66 $g/cm^3$ to about 2.20 $g/cm^3$, or from about 0.66 $g/cm^3$ to about 2.10 $g/cm^3$, or from about 0.80 $g/cm^3$ to about 2.20 $g/cm^3$, or from about 0.90 $g/cm^3$ to about 2.20 $g/cm^3$, or from about 1.00 $g/cm^3$ to about 2.20 $g/cm^3$, or from about 1.10 $g/cm^3$ to about 2.20 $g/cm^3$, or from about 1.20 $g/cm^3$ to about 2.20 $g/cm^3$, or from about 1.30 $g/cm^3$ to about 2.20 $g/cm^3$, or from about 1.40 $g/cm^3$ to about 2.20 $g/cm^3$, or from about 1.50 $g/cm^3$ to about 2.20 $g/cm^3$, or from about 1.60 $g/cm^3$ to about 2.20 $g/cm^3$, or from about 1.70 $g/cm^3$ to about 2.20 $g/cm^3$, or from about 1.80 $g/cm^3$ to about 2.20 $g/cm^3$, or from about 1.90 $g/cm^3$ to about 2.20 $g/cm^3$, or from about 2.00 $g/cm^3$ to about 2.20 $g/cm^3$, or from about 2.10 $g/cm^3$ to about 2.10 $g/cm^3$, or from about 0.66 $g/cm^3$ to about 2.0 $g/cm^3$, or from about 0.66 $g/cm^3$ to about 1.90 $g/cm^3$, or from about 0.66 $g/cm^3$ to about 1.80 $g/cm^3$, or from about 0.66 $g/cm^3$ to about 1.70 $g/cm^3$, or from about 0.66 $g/cm^3$ to about 1.60 $g/cm^3$, or from about 0.66 $g/cm^3$ to about 1.50 $g/cm^3$, or from about 0.66 $g/cm^3$ to about 1.40 $g/cm^3$, or from about 0.66 $g/cm^3$ to about 1.30 $g/cm^3$, or from about 0.66 $g/cm^3$ to about 1.20 $g/cm^3$, or from about 0.66 $g/cm^3$ to about 1.10 $g/cm^3$, or from about 0.66 $g/cm^3$ to about 1.00 $g/cm^3$, or from about 0.66 $g/cm^3$ to about 0.90 $g/cm^3$, or from about 0.66 $g/cm^3$ to about 0.80 $g/cm^3$, or from about 0.90 $g/cm^3$ to about 1.80 $g/cm^3$, or from about 0.80 $g/cm^3$ to about 1.00 $g/cm^3$, or from about 1.00 $g/cm^3$ to about 1.50 $g/cm^3$, or from about 0.80 $g/cm^3$ to about 1.10 $g/cm^3$, or from about 0.90 $g/cm^3$ to about 1.40 $g/cm^3$, or from about 1.10 $g/cm^3$ to about 1.30 $g/cm^3$, or from about 1.30 $g/cm^3$ to about 2.00 $g/cm^3$, or from about 1.50 $g/cm^3$ to about 1.90 $g/cm^3$, or from about 1.80 $g/cm^3$ to about 2.00 $g/cm^3$.

The porous layer (e.g. ePTFE) may be compressed under a pressure from about 1 MPa to at least about 60 MPa, or from about 12 MPa to at least about 60 MPa, or from about 16 MPa to at least about 32 MPa, or at 16 MPa, or at 60 MPa to form the densified portions. In embodiments in which the densified portions of the porous layer form a grid, the grid may have a line width from about 0.25 mm to about 5.00 mm, or from about 0.25 mm to about 4.50 mm, or from about 0.25 mm to about 4.00 mm, or from about 0.25 mm to about 3.50 mm, or from about 0.25 mm to about 3.00 mm, or from about 0.25 mm to about 2.50 mm, or from about 0.25 mm to about 2.00 mm, or from about 0.25 mm to about 1.50 mm, or from about 0.25 mm to about 1.00 mm, or from about 0.25 mm to about 0.50 mm, or from about 0.25 mm to about 1.25 mm, or from about 0.50 mm to about 1.75 mm, or from about 0.50 mm to about 1.50 mm, or from about 0.50 mm to about 1.75 mm, or from about 0.50 mm to about 1.50 mm, or from about 0.25 mm to about 1.25 mm, or from about 1 mm to about 5 mm, or from about 2 mm to about 5 mm, or from about 3 mm to about 5 mm, or from about 4 mm to about 5 mm, or from about 2 mm to about 4 mm, or from about 1 mm to about 3 mm, or from about 0.5 mm to about 2.00 mm. In embodiments in which the densified portions of the porous layer form a grid, the grid may have a line width from about 0.40 mm to about 1.00 mm, or from about 0.40 mm to about 0.90 mm, or from about 0.40 mm to about 0.80 mm, or from about 0.40 mm to about 0.70 mm, or from about 0.40 mm to about 0.60 mm, or from about 0.50 mm to about 0.80 mm, or from about 0.60 mm to about 0.80 mm, or from about 0.42 mm to about 0.83 mm.

In embodiments in which the densified portions of the porous layer form a grid, the space between grid lines may be from about 1 mm to 10 mm, or from about 1.5 mm to about 4 mm, or from about 2 to about 8 mm, or from about 2 to about 6 mm, or from about 3 to about 6 mm, or from about 1 to about 4 mm. In embodiments in which the densified portions of the porous layer form a grid the space between grid lines may be from about 2.0 mm to about 5.0 mm, or from about 2.5 mm to about 4.5 mm, or from about 3.0 to about 5.0 mm, or from about 3.5 mm to about 5.0 mm, or from about 4.0 to about 5.0 mm, or from about 2.5 mm to about 4.5 mm, or from about 2.5 mm to about 3.5 mm.

Without wishing to be bound by theory, the compression range of the composite sealant may be defined by the geometry (line width) and relative thickness of densified porous layer and elastomer layers. The geometry (line width) and relative thickness of densified porous layer and elastomer layers may define defining the thickness of the composite sealant at the densified portions (i.e. the "stiff portions"). At any given thickness, if the line width is narrow, the parameters may be operable to compress to a thinner thickness at for the same given pressure due to the shape factor difference, which confers the composite sealant with greater freedom to deform.

In operation, the selectively densified composite sealant has a high reversible strain when compressed. The sealant may compress up to about 90% strain under stress of 60 MPa, when measured according to the percent compression test described herein. The selectively densified composite sealant may compress to a strain ranging from about 10% to about 90%, or from about 30% to about 70%, or from about 20% to about 60%, or from about 50% to about 90%, or from about 70% to about 90%, or from about 10% to about 60%, or from about 30% to about 85%, under a stress of about 60 MPa when measured according to the percent compression test described herein The sealant may maintain its structural integrity at a range of temperatures from about −50° C. to at least about 100° C. The sealant may remain non-wettable to challenge liquids (e.g. water, organic solvents, fuel) at a range of temperatures from about −50° C. to at least about 100° C. The sealant may be configured to maintain a liquid seal (e.g. at a joint between multiple parts) at a range of temperatures from about −50° C. to at least about 100° C. Generally, the densified portions of the porous layer and the elastomer of the elastomeric layer are liquid impermeable. The densified portions of the porous layer and the elastomer of the elastomeric layer may be impermeable to the challenge fluid, for example water, organic solvents, jet fuel, hydraulic fluids, oils, de-icing agents, and the like. The densified portions of the porous layer and the elastomer of the elastomeric layer may be resistant to chemical attack, for example by common solvents, e.g. by various challenge fluids including but not limited to water, jet fuel, hydraulic fluids (including phosphate ester based), oils, de-icing agents, or other materials In a second aspect there is provided a method of forming a selectively densified composite sealant. The method includes providing a porous membrane having an initial density and compressing the porous membrane in a pattern to form a selectively densified porous layer. The selectively densified porous layer has a first major surface and an opposing second major surface, and the pattern of densified portions and undensified portions forms respective valleys and peaks in at least one of the first and/or second major surfaces of the porous layer. The method further includes coating the first major surface with a first elastomeric material or elastomeric material precursor to form a first elastomeric layer disposed on the first major planar surface. The first and/or the second elastomeric material(s) may be applied in a single coating or in multiple (i.e. two or more) coats. The first and/or the second elastomeric material(s) may comprise a single elastomer or more than one elastomer. In some embodiments, the first and/or the second elastomeric material comprises 2, 3, 4, 5, or 6 coats of elastomer. The elastomeric material is cured to form the composite sealant.

The method may include coating the second major surface of the selectively densified porous layer with a second elastomeric material to form a second elastomeric layer disposed on the second major planar surface. The second elastomeric material may be the same as the first elastomeric material, or the first and second elastomeric materials may be different. The selectively densified porous layer may be coated with the elastomeric material without imbibing the elastomeric material into the undensified regions. In other words, the selectively densified porous layer may be coated with the elastomeric material without the elastomeric material entering or becoming entrapped in the pores of the undensified regions of the porous layer. The elastomeric material may be partly imbibed, i.e. partially penetrate into the undensified regions during the coating process.

Before the step of coating the selectively densified porous layer with the elastomeric material, the method may further comprise the step of disposing a barrier film on the porous layer prior to compression or on the selectively densified porous layer after compression. The barrier film may be configured to prevent ingress of the elastomeric material into the undensified regions of the selectively densified porous layer. The barrier film may be deposited on the selectively densified porous layer either before or after the porous layer is compressed to form the pattern of selectively densified regions.

The method may further comprise the step of applying adhesive on an outer surface of the first elastomeric material or on an outer surface of the second elastomeric material. The adhesive may be applied discontinuously, for example as discrete dots. Alternatively, the adhesive may be applied as a continuous layer. Without wishing to be bound by theory, the addition of an adhesive to the outermost surface (s) of the composite sealant may simplify installation of the composite sealant by a user and in order to mitigate the displacing effects of lateral force on the composite sealant.

BRIEF DESCRIPTION OF THE DRAWINGS

The present disclosure will be better understood in view of the appended non-limiting figures.

FIG. 10A shows the sealant just after immersion in the fluid and FIG. 10B shows the sealant 10 hours post immersion in the fluid.

Figure 1:
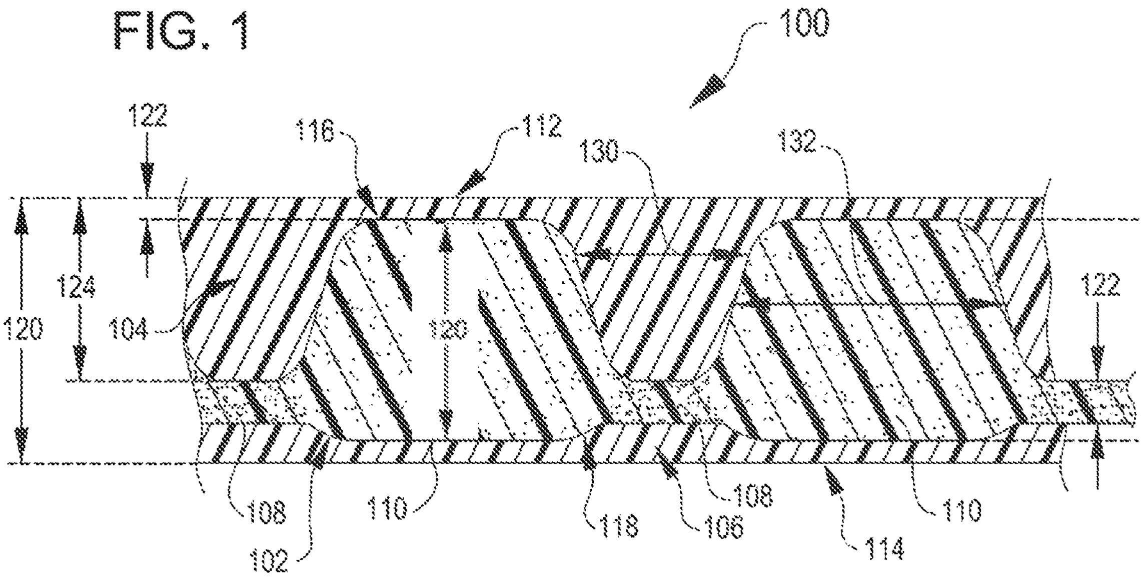
FIG. 1 is a side cross sectional view of an embodiment of a selectively densified composite sealant.

While the following is amenable to various modifications and alternative forms, specific embodiments have been shown by way of example in the drawings and are described in detail below. The intention, however, is not to limit the claims to the particular embodiments described. On the contrary, the description is intended to cover all modifications, equivalents, and alternatives thereof.

DETAILED DESCRIPTION

Various embodiments disclosed herein relate generally to dry sealants for protecting a mechanical interface, e.g., in an airframe structure or comparable structure. In specific embodiments, a dry sealant can be formed of a porous membrane material compressed in a pattern to form selectively densified regions in a selectively densified membrane, with interstitial spaces between the selectively densified regions occupied by an elastomer. Suitable elastomers are chemically inert to one or more possible challenge fluids, so that the elastomer limits the ability of liquids to penetrate the interface, in order to prevent corrosion, liquid intrusion, or other issues. Suitable elastomers can be formed of a chemically inert material for preventing intrusion by water, jet fuel, hydraulic fluids (including phosphate ester based), oils, de-icing agents, or other materials.

The selectively densified membrane, which is at least partly surrounded by the elastomer, can also be chemically inert with respect to at least one of the possible challenge fluids, and is non-wettable to the challenge fluid at least in the selectively densified regions. Thus, non-densified regions and densified regions in the pattern of selectively densified regions in the membrane material form peaks and valleys in at least one of the first major surface and/or the second major surface of the porous layer, with the valleys filled by the elastomer. The undensified regions forming the peaks are isolated from one another by the selectively densified regions and the elastomer so that the undensified regions form a pattern of low-density regions that are more compressible than the elastomer, and that lend increased compressibility to the dry sealant as a whole.

The porous layer (or membrane) may be a porous polymer or fluoropolymer, e.g., a porous membrane such as an expanded polytetrafluoroethylene (ePTFE) membrane, a polypropylene membrane, or an expanded polyethylene membrane. The porous membrane and elastomer are connected together by way of the elastomer being deposited on the surface of the porous layer and formed around the features of the selectively densified porous layer to form a composite.

The elastomer may be any suitable elastomer that can be formed to a complex surface (e.g., a grooved or patterned surface). According to some embodiments, the elastomer can be a polymer that is configured to be deposited as a liquid, i.e. poured, molded, printed, or otherwise deposited, and then cured to retain its shape. Alternatively, the elastomer may be deposited by heat treatment, e.g. melting and deposition on the porous membrane. The elastomer may be deposited in a single coat or in more than one coat. In some embodiments, the elastomer is deposited in 2, 3, 4, or 5 coats. In some embodiments the elastomer comprises a single type or elastomer or a mixture of elastomers. In embodiments in which the elastomer is applied in more than one coat, all the coats of elastomer may comprise the same elastomer or the elastomer of all or some of the coats may be different. When set and cured, the elastomer fills in the valleys between undensified regions of the porous membrane, while the porous membrane is operable to reversibly compress under load to provide sealing capabilities with a high working range, i.e., being capable of sealing a gap in an interface at a wide range of clamping pressures or between uneven surfaces. The elastomer may comprise an elastomeric matrix comprising one or more of a silicone, fluorosilicone, or a perfluoropolyether elastomer. The elastomer may comprise a fluoroelastomer.

The disclosure may be better understood with reference to the Figures, in which like parts have like numbering.

FIG. 1 is a side cross sectional view of one embodiment of a selectively densified composite sealant 100. The composite sealant 100 includes a porous layer 102 and two elastomeric layers 104, 106 sandwiching the porous layer. The porous layer 102 is selectively densified in a pattern formed of alternating densified regions 108 and undensified regions 110, forming respective valleys and peaks in the porous layer. In some embodiments, the undensified regions 110 can remain substantially porous prior to compression in use. These valleys are filled by the elastomeric material of the first elastomeric layer 104. In the embodiment shown, the peaks and valleys are primarily formed in an upper boundary 116 of the porous layer, with the bottom boundary 118 of the porous layer remaining relatively flat. However, in alternative embodiments, the porous layer 102 can be selectively densified more or less symmetrically.

The selectively densified composite sealant 100 is able to seal large gaps as well as compress to low thicknesses (e.g. by removing substantially all the air from the pores of the densified regions of the composite sealant). This functionality requires that the composite sealant compress to high strains under compressive force. While the elastomeric material of the elastomeric layers 104, 106 alone may lack sufficient compressibility to perform this function alone, the undensified portions 110 of the porous layer 102 effectively separate the elastomeric layers 104, 106 into a series of relatively narrow columns that can deform more readily under compressive force.

The relative densities of the sections can be adjusted to tune the compressibility of the composite sealant 100 as a whole. For example, the density of the first elastomeric layer 104 can vary, both at a first partial thickness 122 of the elastomer at undensified regions 110 (i.e. the narrower thickness of elastomer above the undensified portions 110), and at a second partial thickness 124 of the elastomer above the densified regions 108 (.e. the thickness of the elastomeric "columns,").

The porous layer 102 may be capable of passing liquid therethrough except where densified, i.e., as a side effect of possessing the low density and high compressibility that is conferred on the composite sealant 100 as a whole. Thus, the densified regions 108 are compressed until the porous layer 102 may not become wetted upon fluid challenge at those regions. Without wishing to be bound by theory, the densified regions may become non-wettable upon fluid challenge due to the significantly decreased size and increased tortuosity of any remaining pore structure of the material after densification.

The pattern of densified regions 108 and undensified regions 110 can also vary in width and configuration. For example, the valley width 130, or the space between undensified regions 110, can vary from about 0.25 mm to about 2.00 mm, or from 0.5 to 1.0 mm. In some embodiments, the valleys may be sloped, in which case each valley can vary in width from top to bottom by about 2 mm to about 50 μm. Similarly, the peak width 132, or the space between valleys, can vary from about 1.5 mm to about 4 mm.

Selectively densified composite sealants may also be formed at a range of thicknesses and accommodate various compressive strains. For example, thicknesses of the total composite sealant can vary from about 10 μm to about 3000 μm, about 10 μm to about 2000 μm, about 10 μm to about 1000 μm, or from about 100 μm to about 600 μm. The compressive strains that can be accommodated by selectively densified composite sealants can also vary in turn.

The selectively densified composite sealants may at least partially reversibly compress when subjected to compressive strains varying from about 10% to about 90% at 16 MPa. The selectively densified composite sealants may at least partially reversibly compress when subjected to compressive strains of up to 90% at 60 MPa, or up to 85% at 60 MPa. The selectively densified composite sealants may at least partially reversibly compress when subjected to compressive strains varying from about 30% to 85% at 60 MPa. For example, specific embodiments of selectively densified composite sealants can reversibly compress when subjected to compressive strains varying from about 15% to about 75% at 16 MPa, or from 28% to 48% at 16 MPa.

Figure 2:
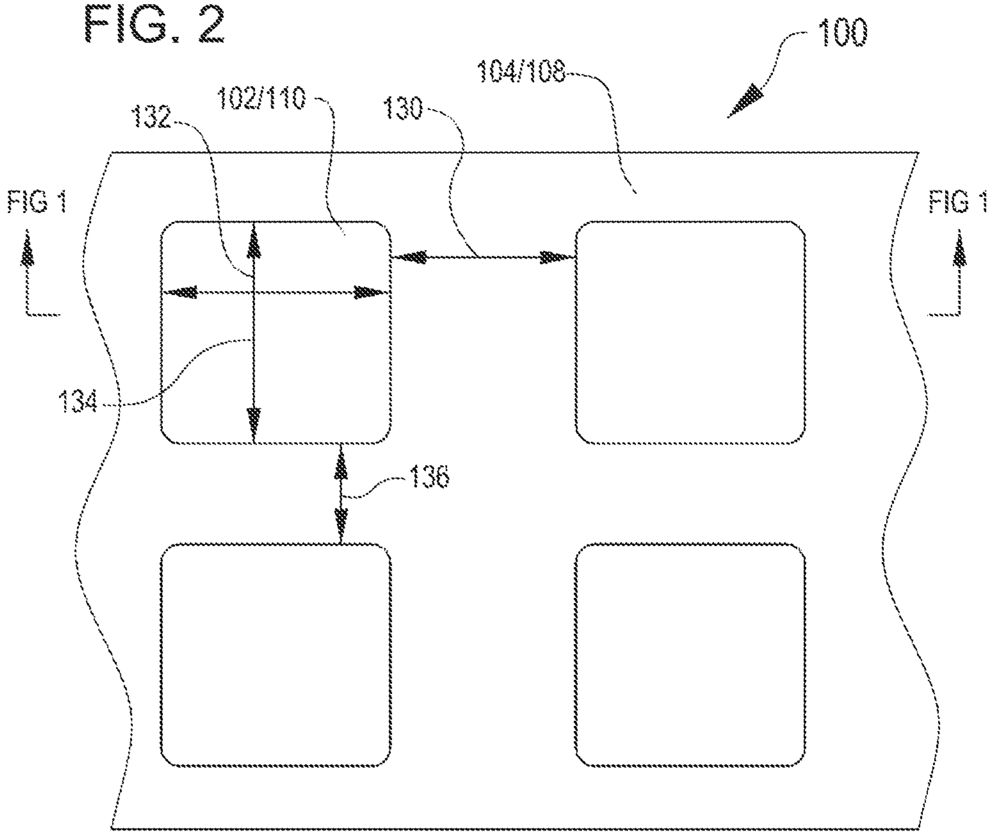
FIG. 2 is a top section view of the selectively densified composite sealant of FIG. 1.

The configuration of the pattern of densified and undensified regions 108, 110 of the example composite sealant 100 is shown in detail in FIG. 2, which is a top section view of the selectively densified composite sealant of FIG. 1. FIG. 2 shows a rectangular array of undensified regions 110 of the porous layer 102, surrounded by densified regions 110 containing the fill material of the elastomeric layer 104. Note that at a different (i.e. lower) section, the densified regions 110 would include the densified portions of the porous layer 102. The pattern of densified and undensified regions can be square or can vary, i.e., the valley widths 130 and 136 can be the same or can be different, as can the peak widths 132, 134 of the undensified regions 110. In alternative embodiments, composite sealants can be made with different patterns of densified and undensified regions, where the undensified regions are generally surrounded and separated from each other by a fill of elastomeric material. For example, the pattern can be a square grid, a rectangular grid, a triangular or hexagonal grid, or any pattern of shaped undensified regions surrounded by densified fill. This separation prevents liquid ingress through the porous layer 102 when the composite sealant 100 is exposed to liquid challenge from the side, i.e. the fully densified portions 110 and the elastomeric layer 108 are liquid impermeable and thus prevent liquid ingress from progressing past the first fully densified portion and function as a seal.

Figure 3:
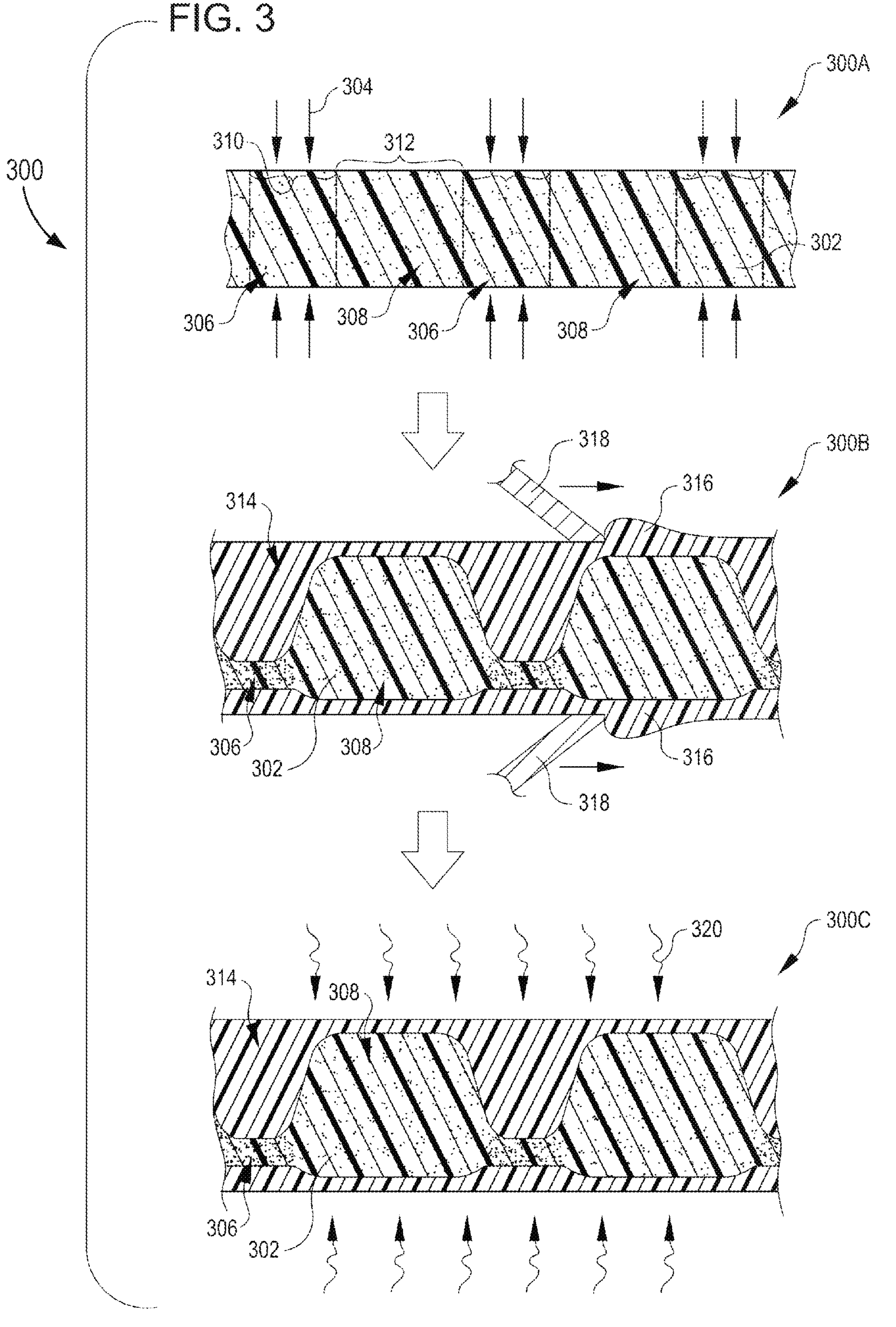
FIG. 3 is a side cross sectional view showing example steps for generating a selectively densified composite sealant.

FIG. 3 is a side cross sectional view showing example steps in a process 300 for generating a selectively densified composite sealant like the sealant 100 in FIG. 1, in accordance with various embodiments of the present disclosure. In a first stage 300A, an undensified porous layer 302 is selectively compressed in a pattern under a pattern of applied pressure 304. This pressure 304 may be applied by, e.g., a grid-shaped tool having alternating teeth and voids and may be performed under heating. The pressure 304 may be applied in a pressure cell at pressures varying from about 1 MPa to at least about 60 MPa, or from about 16 MPa to at least about 60 MPa, or from about 22 MPa to about 23 MPa. The final densities of the densified regions 306 may vary from about 0.08 g/cm$^3$ to about 0.55 g/cm$^3$, or from about 0.40 g/cm$^3$ to about 0.60 g/cm$^3$. Within the context of this disclosure, tool separation refers to the spacing between bossed surfaces of the tool employed for compressing the material and forming the densified regions 306. This separation becomes the geometry of the undensified regions 308 in the selectively densified composite (e.g. squares in a grid). Although various patterns can be implemented in the densification step, tool separation that results in the undensified regions 308 can vary from about 1.5 mm to about 4 mm, or from about 1.5 mmm to about 2.5 mm, or from about 1.5 mm to about 2 mm, of from about 2 mm to about 2.5 mm, or from about 2 mm to about 4 mm, or from about 2.5 mm to about 4 mm, or from about 3 mm to about 4 mm, or from about 3.5 mm to about 4 mm, or from about 2 mm to about 3 mm, or from about 2.5 mm to about 3 mm, or can be about 2 mm.

In the second stage 300B of generating the selectively densified composite sealant, the elastomer layer 314 is added to the selectively densified porous layer 302. This elastomer layer 314 can be added as one or more layers of a liquid composite precursor or can be deposited using any other comparable means. For example, the elastomer layer 314 may be added as a liquid elastomer precursor and then formed to a uniform thickness by, e.g., scraping excess 316 using a removal tool 318.

The elastomeric layer 314 is added on both surfaces of the porous layer 302 simultaneously or in two separate steps. Alternatively, the elastomer may be deposited as a layer on each surface of the porous layer and then subjected to heat to melt or soften in order to fill in the valleys of the densified portions of the porous layer.

After coating the elastomer needs to be cured. The elastomer may be cured following a heat treatment. Curing temperatures and times may vary according to the selected elastomer and thickness. The process step order of heat exposure may vary. In the third stage 300C of generating the selectively densified composite sealant, the elastomer layer 314 is set by heat treatment 320 and cured to form a tack free composite. The composite sealant may be treated by curing in an oven for at least 5 minutes, for example for about 5 minutes to about 10 mins, at a temperature of about 100° C. to about 200° C. In some embodiments, each side of the porous layer 302 may be treated individually, for example after each layer of elastomer is applied to each side (or major surface), and the process steps may then be repeated for the other side (i.e. the other one of the first or second major surfaces) of the composite. In other embodiments, the heat treatment may be carried out after both sides have been coated with elastomer.

Figure 4:
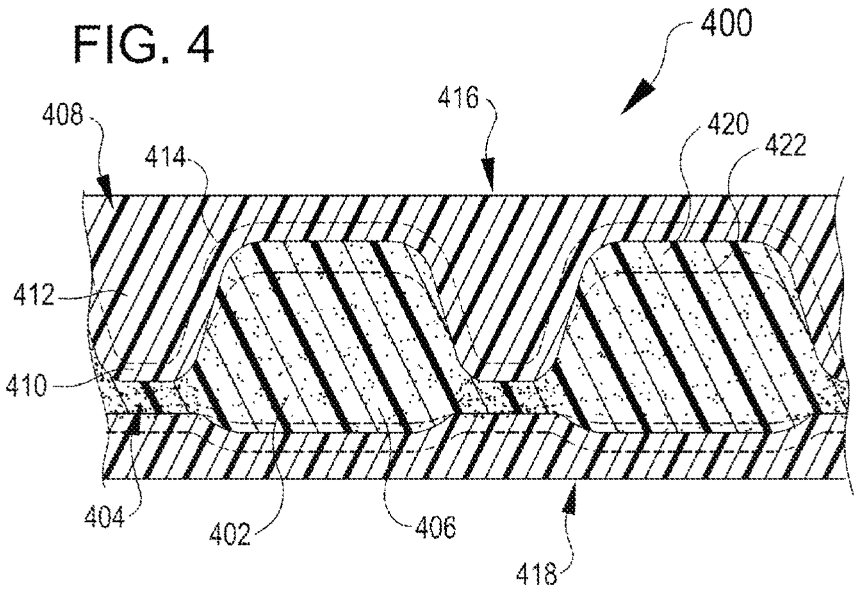
FIG. 4 is a side cross sectional view of a second embodiment of a selectively densified composite sealant.

The interior construction of the selectively densified composite sealants can vary depending on the specific elastomer selected, and particularly whether the elastomer can be deposited and cured in one pass, and whether the elastomer penetrates the porous layer, as shown in FIG. 4.

FIG. 4 is a side cross sectional view of a second embodiment of a selectively densified composite sealant 400, similar to the selectively densified sealant 100 of FIGS. 1-2. The porous layer 402 includes alternating densified regions 404 of the porous layer and undensified regions 406 of porous layer. The valleys formed above the densified regions 404 are filled with an elastomeric layer 408 that more narrowly covers the undensified regions 406 to form smooth top and bottom surfaces 416, 418 of the composite 400. In the embodiment of FIG. 4, the elastomeric layer 408 includes a first layer 410 of elastomeric material and second layer 412 of elastomeric material, with a first boundary 414 between the first and second layers 410, 412. The first layer 410 can be formed by a first deposition and curing process, after which follows a second deposition and curing process to add a second layer 412. In some embodiments, multiple additional layering processes may be used to incrementally add layers of elastomeric material, depending on the viscosity of the elastomeric material during deposition and depending on whether the geometry of the valleys in the porous layer 402 permit the deposition of large amounts of elastomeric material at once. For example, in some embodiments, 2 coats of the elastomer may be used on each side (making the total number of coats in the composite membrane 4 (i.e. 2 coats on each side). In some alternative embodiments, 3 coats, 4 coats, or more may be used on each side.

The first layer 410 is also shown partially penetrating the porous layer 402 in the undensified regions 406. In some embodiments, the deposited liquid elastomeric material may partially penetrate through the porous layer 402, which can further bond the elastomeric material with the porous layer 402 in a penetrated or imbibed region 420 down to a penetration depth shown by 422. In some embodiments, multiple layers of elastomeric material may be added so that the first layer 410 minimally penetrates the porous layer 402 and then forms a barrier to prevent further intrusion by a volume of elastomeric material added in a second layer 412 or subsequent layers.

Figure 5:
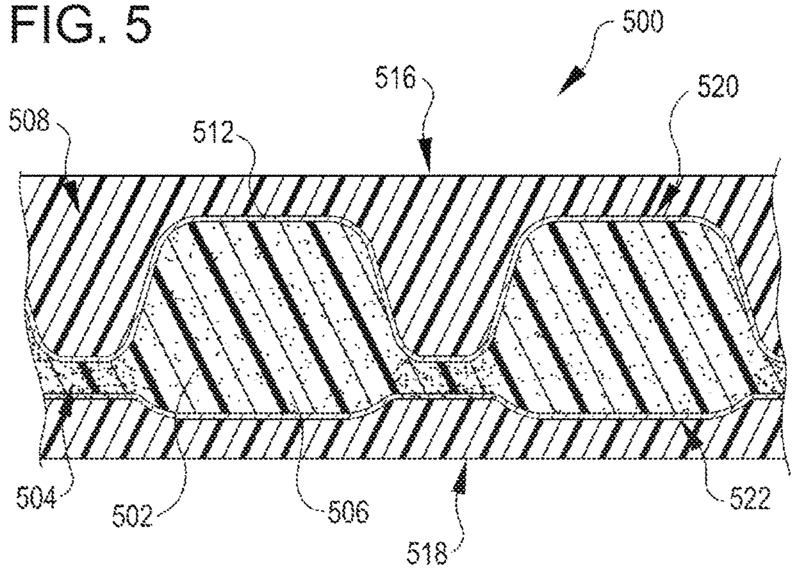
FIG. 5 is a side cross sectional view of a third embodiment of a selectively densified composite sealant.

FIG. 5 is a side cross sectional view of a third embodiment of a selectively densified composite sealant 500, also similar to the selectively densified sealant 100 of FIGS. 1-2. The porous layer 502 includes alternating densified regions 504 of the porous layer and undensified regions 506 of porous layer. The valleys formed above the densified regions 504 are filled with an elastomeric layer 508 that more narrowly covers the undensified regions 506. In the embodiment shown in this figure, a single elastomeric layer 508 is deposited in a fill pattern to fill valleys between the undensified regions 506 to form smooth top and bottom surfaces 516, 518 of the composite 500. Unlike the embodiment of FIG. 4, the elastomeric layer 508 can be separated from the undensified portions 506 of the porous layer 502 by a non-wettable film or barrier layer 512 that prevents ingress of elastomer into the undensified portions 506. The barrier layer 512 can be formed of any suitable nonporous film or membrane such as, but not limited to, a polymer or fluoropolymer film. In some embodiments, the barrier layer 512 is a compression-densified ePTFE film, a non-wettable ePTFE film, a non-wettable ePE film, a fluorinated ethylene propylene FEP, a biaxially-oriented polypropylene (BOPP) thermal lamination film comprising coextruded BOPP and hot melt adhesive, or similar layer. The non-wettable film 512 can form top and bottom interior surfaces 520, 522 that can receive the elastomeric material.

Figure 6:
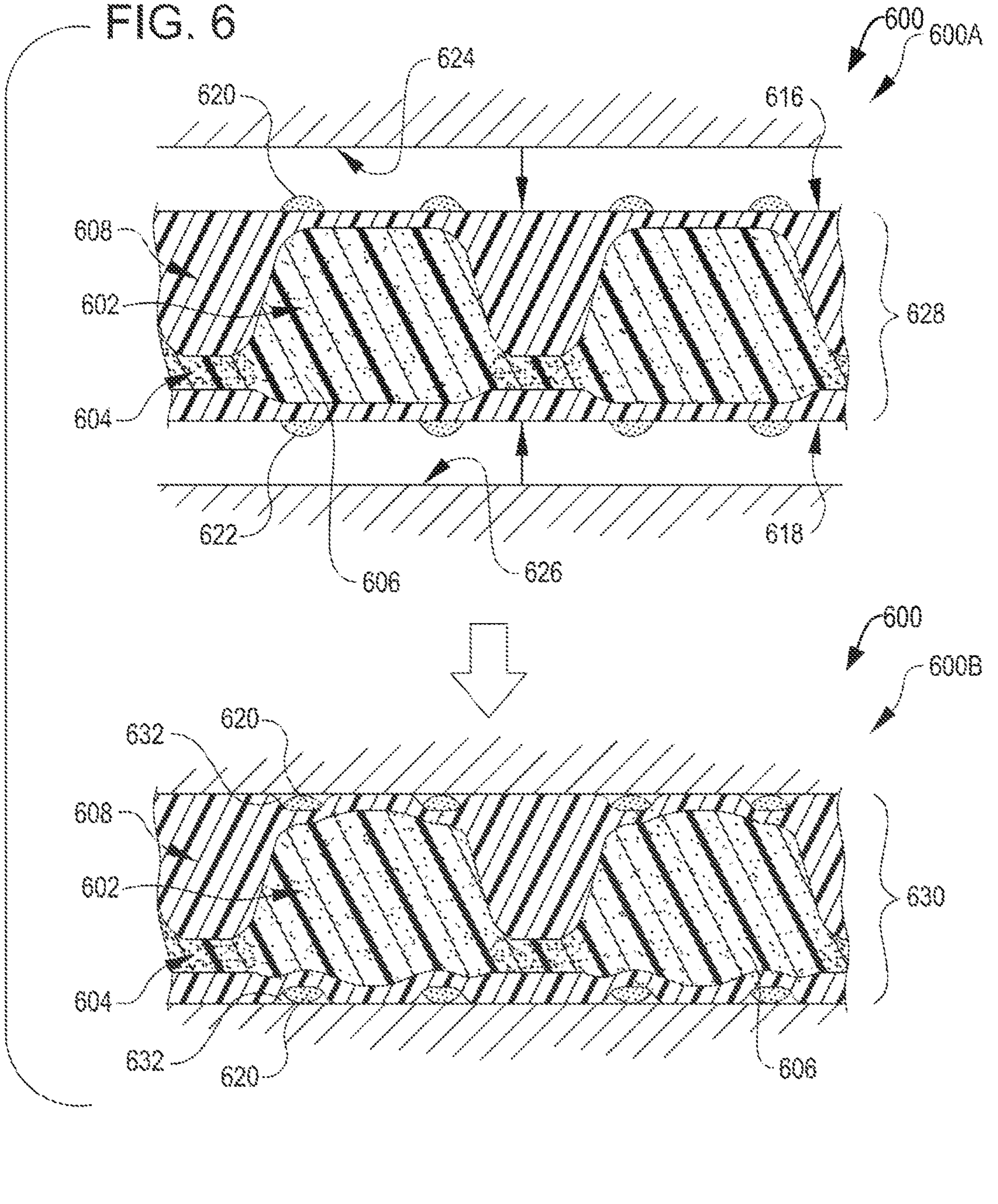
FIG. 6 is a side cross sectional view showing an example of a selectively densified composite sealant dotted with a discontinuous adhesive and undergoing compression.

Selectively densified composite sealants can include various adhesive coatings to further secure the seals when installed. FIG. 6 is a side cross sectional view showing an example of a selectively densified composite sealant 600 dotted with a discontinuous adhesive 620 and undergoing compression. The composite sealant 600 includes a porous layer 602 having alternating densified regions 604 and undensified regions 606 in a pattern as described above. The pattern forms valleys adjacent the densified regions 604 that are filled with an elastomeric layer 608 that forms the outer surfaces of the composite, i.e. the top surface 616 and bottom surface 618. A first set of discontinuous adhesive regions 620 can be added to the composite 600 on the top surface 616 and a second set of discontinuous adhesive regions 622 can be added to the bottom surface 618. These discontinuous adhesive regions 620 can adhere to a joint when the composite 600 inserted between first and second joined surfaces 624, 626, and adhere thereto, in order to simplify installation of the composite sealant by a user and in order to mitigate the displacing effects of lateral force on the composite sealant. When placed under stress, the composite sealant 600 can compress from an initial thickness 628 to a final thickness 630, causing the sealant to deform around adhesion sites 632 containing the adhesive regions 620. This deformation under compression is sufficient to fully engage the outer surfaces 616, 618 with the joined surfaces 624, 626 around the adhesion sites 632 in order to provide a seal between the adhesion sites.

Figure 7:
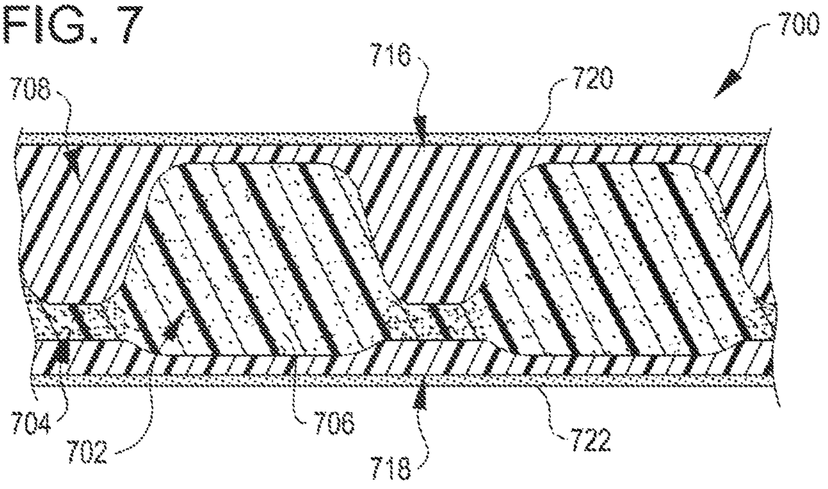
FIG. 7 is a side cross sectional view showing an example of a selectively densified composite sealant with a continuous adhesive layer.

In some embodiments, selectively densified composite sealants can include continuous adhesive coatings. For example, FIG. 7 is a side cross sectional view showing an example of a selectively densified composite sealant 700 with continuous adhesive layers 720, 722. The composite sealant 700 includes a porous layer 702 having alternating densified regions 704 and undensified regions 706 in a pattern as described above. The pattern forms valleys adjacent the densified regions 704 that are filled with an elastomeric layer 708 that forms the outer surfaces of the composite, i.e. the top surface 716 and bottom surface 718. The first continuous adhesive layer 720 on the top surface 716 and the second continuous adhesive layer 722 on the bottom surface 718 can be used to adhere the composite sealant 700 to joined surfaces during installation and to help mitigate displacing effects of any lateral forces on the seal.

Figure 8A:
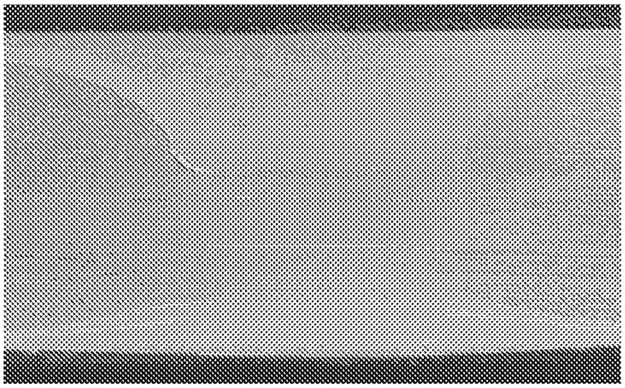
FIG. 8A is a Scanning Electron Microscopy (SEM) image of a cross section of the selectively densified composite sealant of example 3.
Figure 8B:
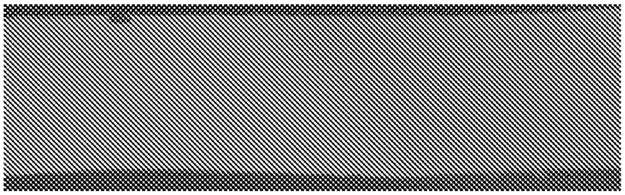
FIG. 8B is an SEM image of a cross section of the selectively densified composite sealant of example 9.
Figure 8C:
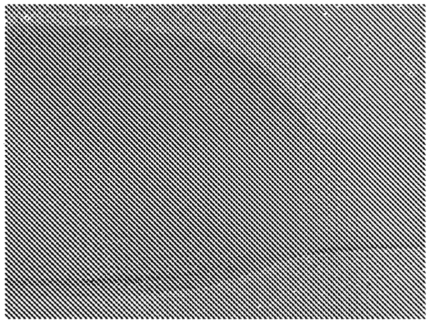
FIG. 8C is an enlarged SEM image of the selectively densified composite sealant of example 9 (FIG. 8B).
Figure 8D:
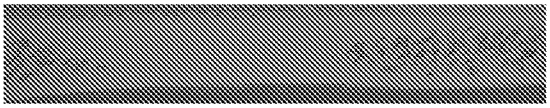
FIG. 8D is an SEM image of a cross section of the selectively densified composite sealant of example 15.
Figure 8E:
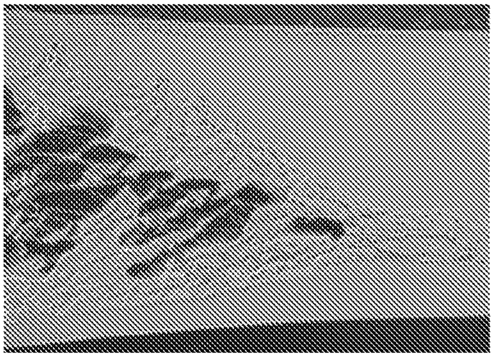
FIG. 8E is an enlarged SEM image of the selectively densified composite sealant of example 15 (FIG. 8D).

FIGS. 8A, 8B and C and 8D and E show SEM cross section images of the selectively densified sealants of example 3. FIGS. 8B and C show SEM cross section images of the selectively densified sealants of example 9, and FIGS. 8D and E show SEM cross section images of the selectively densified sealants of example 15. As it can be seen in the cross-section images, there are densified regions disposed between pockets of undensified regions of the porous layer. The porous layer has an elastomeric layer disposed at either side. As better observed in Figures D and E, the densified regions either have no openings/pores or reduced size of the openings/pores compared to the undensified regions, thus preventing liquid to pass through densified regions. This in turn results in the densified regions becoming non-wettable.

Figure 9:
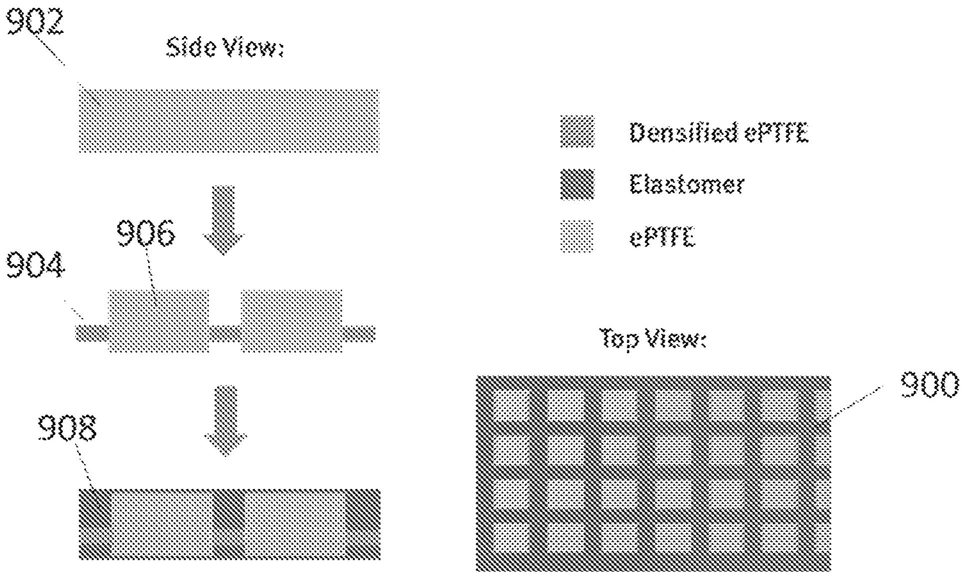
FIG. 9 is a schematic representation of a method of producing a selectively densified composite sealant.

FIG. 9 shows a schematic representation of a method of producing a selectively densified composite sealant 900. The method involves providing a porous membrane 902 (e.g. ePTFE, although other porous membranes are envisaged), then applying pressure to selected regions of the porous membrane 902 to create a densified regions 904 separated from each other by undensified regions 906, (in this case in a grid pattern, but other patterns are envisaged). Finally, an elastomeric layer 908 is applied to the first major surface and in this particular embodiment also to the second major surface.

Figure 10A:
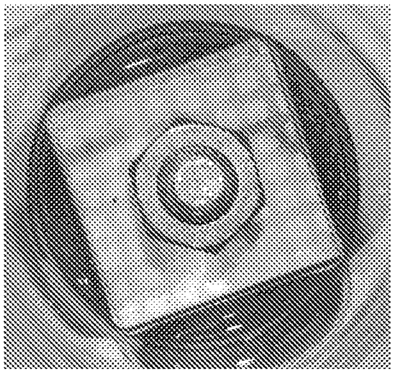
FIGS. 10A and 10B are images of a selectively densified composite sealant according to an embodiment, wherein the sealant has been immersed in colored fluid.
Figure 10B:
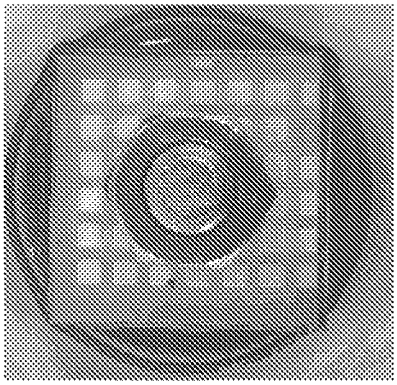

FIGS. 10A and 10B show images of a selectively densified sealant according to an embodiment. In FIG. 10A the sealant is shown just before being immersed in colored solvent. FIG. 10B is an image of the selectively densified sealant of FIG. 10A taken 2 hours after immersion in the colored solvent. FIG. 10B shows color where liquid entered though the cut edge of the sealant, and also shows how fluid stops at the grid line (densified portion). Therefore, liquid intrusion stopping is observed in FIG. 10B. In this sealant the right edge is barely cut in to the "white square" (undensifed region), and therefore in this region there is more limited liquid intrusion.

Test Methods

Thickness, Density, and Percent Compression

To test the physical thickness, density, and percent compression metrics, the following procedures were carried out. First, each sample of supported elastomeric foam was cut with a punch to 2.263 cm diameter, weighed on a precision scale, and then placed on a platen on an INSTRON 5565 dynamic mechanical analyzer (Instron Tool Works, Inc., MA, USA). A compression disc of 1.786 cm diameter was placed on top of the sample. A compressive stress-strain test was begun where the analyzer head moves at a strain rate of 0.06 mm/min until it reaches a load of 0.74 N. Together with the mass and size of compression disc, this resulted in a pressure on the sample of 3.45 kPa. The thickness of the sample was extracted at 0.3 MPa. 0.3 MPa is the point used to assess initial thickness, which is used in the thickness, density, and as the denominator in the strain (% compression) equation. Using this thickness and the mass measured earlier, the density of each sample was calculated. Once the analyzer reached 0.74 N, it continued compressing the sample at a strain rate of 0.6 mm/min while capturing load data on its load cell to create a stress-strain curve. The compressive strains on the sample were extracted at a pressure of 1 MPa and 16 MPa to represent this curve.

Hysteresis

Each sample was cut with a punch to a predetermined diameter of about 8 mm and placed on a platen on an RS17 Dynamic Mechanical Analyzer (TA Instruments, New Castle, DE, USA). The samples were "loaded" by compressing to a target strain (described below) while measuring stress to generate a stress-strain loading curve. The samples were then "unloaded" by raising the compression disc back to its original location while measuring stress to generate a stress-strain unloading curve. Typically, the unloading curves measured a negligible or zero stress at a nominal strain before 0 percent strain was reached. The amount of compressive strain still applied to a sample when there was no longer compressive stress during the unloading curve was extracted as a metric for the sample. The compression set is calculated by taking this unloading strain metric and dividing it by the peak compressive strain on the sample. The total energy difference in the loading and unloading curves was used as an indication of a quantity of mechanical energy that can be stored and returned by each sample instead of being lost during cyclic compression as heat. The total mechanical energy in each loading curve was calculated by approximating the definite integral between 0 percent strain and the peak strain reached by the sample. The total mechanical energy in each unloading curve was calculated by approximating the definite integral between the peak strain reached by the sample and the strain at which zero stress was reached (the compression set). The Percent Strain Energy Maintained was calculated by taking the integral from the unloading curve and dividing it by the integral from the loading curve.

Stress Retention

Each sample was cut with a punch to a predetermined diameter of about 8 mm and placed on a platen on RS17 Dynamic Mechanical Analyzer (TA Instruments, New Castle, DE, USA). Each sample was compressed to a target strain while dynamically measuring the material modulus. While holding at this target strain, the material modulus was continuously monitored for a preset length of time before unloading the sample. The Percent Stress Retained was calculated by dividing the modulus measured five minutes after the target strain was reached by the modulus measured at the moment target strain was reached.

Liquid Intrusion/Sealing

Each Ingress sample was cut with a die in a press to a square shape with a centered hole. This cut sample was weighed and captured as a mass before immersion. Each cut sample was compressed between a stainless steel plate and a polished plexiglass plate having the same area dimensions as the sample. Each stackup was held together with a machine bolt and locknut. The percent compression on each sample was calculated by comparing the micrometer measurement of the stackup height without a sample to that measured with an uncompressed and compressed sample. Once the target percent compressions were reached, each stackup was immersed up to the side of the glass plate in JP8 jet fuel and photographed from above through the glass to visually inspect for fluid penetration for a period of 2 hours. The stress at the ingress seal is then estimated by comparing the percent compression to the stress-strain relationship described above. The liquid intrusion test is passed if the sample shows liquid intrusion stopping when fluid stops at the densified portion (shown by the absence of color uptake beyond the densified portion).

Further details regarding the disclosure are described in conjunction with the following examples.

EXAMPLES

A selectively densified composite sealant was constructed using a porous layer (in these examples ePTFE) having an initial thickness from about 0.1 mm to about 0.56 mm and at least one layer of elastomer on each side of the porous layer. The porous layer may have a density from about 0.02 $g/cm^3$ to about 1.00 $g/cm^3$. In some embodiments, the porous layer may have a density from about 0.04 $g/cm^3$ to about 0.55 $g/cm^3$.

The elastomer may be any suitable elastomer that is impermeable to challenge fluids (e.g. water, jet fuel, common solvents such as organic solvents, de-icing fluid). In these examples, the elastomers were chosen among Silicone (SS-2321 from Silicone Solutions), Fluorosilicone (SILASTIC FL 60-9201 from DOW), or perfluoropolyether (SIFEL 2618 from Shin-Etsu Chemical Co. Ltd). The elastomer may operate at the desired range of temperatures for the intended application. For example, in some embodiments, the elastomer is a broad temperature elastomer that can operate at a wide range of temperatures. For example, for aerospace use, the elastomer may be a broad temperature elastomer which may operate from about −50° C. to at least about 100° C. The elastomer may have an elastomeric precursor which is a liquid at room temperature.

A compression tool was created with a raised pattern, which was a grid pattern in these examples. In the examples shown in Table 1, the compression tool was configured to imprint one of two emboss geometries (1 or 2) on the porous layer. Both geometries are pressed at a pressure between 3000 and 4000 psi (approximately 3300 psi). Geometry 1 has a grid line width of 0.83 mm and a grid line spacing of 2 mm. Geometry 2 has a grid line width of 0.83 mm and a grid line spacing of 5 mm. The first major surface of the porous layer was compressed with the compression tool to a pressure of from about 20 MPa to at least about 27 MPa using a hydraulic press. After the compression step a selectively densified porous layer was obtained. This layer presented densified portions defining a continuous path with interspersed undensified portions. The undensified portions of the porous layer may have a density from about 1% to 90% of the density of the porous layer. The densified portions of the porous layer may have a density from about 30% to 100% of the density of the porous layer. The densified portions of the porous layer and the elastomer of the elastomeric layer may be non-wettable or impermeable to the challenge fluid, for example water, organic solvents, jet fuel, hydraulic fluids, oils, de-icing agents, and the like.

The compression step was applied only to one of the first or second major surfaces of the porous layer. In these embodiments, the surface to which the compression step was applied defines a patterned topography (e.g. peaks (undensified portions) and valleys (densified portions)). The opposite of the first or second major surfaces (the major surface to which the compression step has not been applied), may be flat, or may also define a patterned topography.

However, the compression step may also be applied to the first major surface and to the second major surface of the porous layer to create a pattern of densified and undensified portions on both first and second major surfaces.

In these examples, grid patterns were created by applying pressure with a compression tool in a grid pattern only on the first major surface. However, a grid pattern may also be created by applying pressure with a compression tool in a pattern of parallel lines on the first major surface and applying pressure with a compression tool in a pattern of parallel lines on the second major surface, the set of parallel lines of the first major surface being disposed at an angle (e.g. substantially 90°) with respect to the set of parallel lines of the second major surface of the porous layer. In some embodiments, the compression step may only be applied to the first major surface and the second major surface may remain substantially flat.

After compression, the selectively densified porous layer was coated on the first major surface (which presented respective peaks and valleys in the pattern of the compression tool) with the elastomer by sliding the edge of a glass straight edge removal tool across the surface of the film, pushing a small pool of elastomer precursor to a substantially flat surface of the composite sealant. The first major surface comprised regions of thin elastomer layer over the undensified regions of the porous layer and thick elastomer "columns" over the compressed regions (valleys) of the porous layer.

The straight edge was angled with respect to the compressed grid. The surface of the coated porous layer was substantially flat and optionally substantially smooth. After the first coating, the construction was placed in an oven for 10 min at 150° C. or for 5 min at 200° C. to cure the elastomer to a "tack free" state (partial curing).

In some embodiments, the construction was flipped over and the same coating and curing process was repeated on the opposing side (the second major surface) of the selectively densified layer. In embodiments in which the second major surface had not been subjected to a compression state, the thickness of the elastomeric layer may be substantially the same along the entire second major surface. In embodiments in which the second major surface had been subjected to a compression step, the second major surface comprised regions of thin elastomer later over the undensified regions of the porous layer and thick elastomer "columns" over the compressed regions (valleys) of the porous layer. The construction was placed in an oven for 5 to 10 minutes at a temperature of 100° C. to 200° C. according to the oven cycle column in Table 1 to cure the elastomer to a "tack free" state.

In some embodiments the coating and partial curing steps were repeated multiple times. In those embodiments the elastomeric layer comprises more than one elastomeric coating. The elastomers in each of the elastomeric coatings may be the same or different. Each of the examples use the same elastomer throughout a given construction. In the examples with 2 coats of elastomer, a single coat of elastomer is coated on each side of the porous layer. After the first coating and oven cycle, the second surface would be coated. The next oven cycle would be the "cure" cycle of 100° C. for 60 minutes. In the examples with 4 coats of elastomer, there are two coats of elastomer on each side of the porous layer. After the first coating and oven cycle, the second surface would be coated. The next oven cycle would be the "cure" cycle of 100° C. for 60 minutes. Upon completion, another coat of elastomer would be applied to the first surface followed by the "tack free" oven cycle in Table 1. Then a second coat of elastomer would be applied to the second surface (fourth total coat) followed by another "cure" oven cycle.

In some embodiments a barrier layer was included between the elastomer and the porous layer. In these examples, the barrier layer is a 0.006 mm thick compression densified ePTFE with a 0.001 mm FEP coating on one side. One piece of barrier layer was taped to each of two flat metal plates with the FEP surface layer facing upwards. One plate was placed in a press heated to 265° C. and the porous ePTFE was placed on top of and in contact with the exposed FEP surface. Metal shims equal to the thickness of the porous ePTFE minus 0.001" to 0.002" were placed just beyond the perimeter of the porous ePTFE. The second plate was placed above the porous ePTFE with the exposed FEP surface facing down in contact with the porous ePTFE. The stackup was compressed with approximately 700 lbs of force for at least 20 minutes to cause the FEP layers to adhere to each surface of the porous ePTFE. After this, the barrier layer and ePTFE composite could then be selectively densified and coated.

The selectively densified sealant obtained (i.e. the complete sealant laminate) may have a total uncompressed thickness from about 50 μm to about 3000 μm. The sealant may compress up to about 90% strain under stress of about 60 MPa. The sealant may maintain its structural integrity at a range of temperatures from about −50° C. to at least about 100° C. The sealant may remain impermeable to liquids (e.g. water, organic solvents, fuel) at a range of temperatures from about −50° C. to at least about 100° C.

Multiple embodiments performed according to this method are presented in Tables 1 to 3 below. FIGS. 8A, 8B and C and 8D and E show SEM cross section images of the selectively densified sealants of example 3. FIGS. 8B and C show SEM cross section images of the selectively densified sealants of example 9, and FIGS. 8D and E show SEM cross section images of the selectively densified sealants of example 15. (technical details of these examples are presented in Tables 1 and 2 below).

Test Data

TABLE 1

Raw materials and processing used in all examples:

| Example # | ePTFE Thickness (mm) | ePTFE Density (g/cm3) | Barrier Layer | # of Coats | Elastomer | Emboss Geometry ID | Oven Cycle (° C., mins) |
|---|---|---|---|---|---|---|---|
| 1 | 0.561 | 0.55 | Yes | 2 | Silicone (SS-2321) | 1 | 150, 10 |
| 2 | 0.561 | 0.55 | No | 4 | Silicone (SS-2321) | 1 | 150, 10 |
| 3 | 0.561 | 0.55 | No | 4 | Silicone (SS-2321) | 2 | 150, 10 |
| 4 | 0.561 | 0.55 | No | 2 | Silicone (SS-2321) | 2 | 150, 10 |
| 5 | 0.231 | 0.42 | No | 4 | Silicone (SS-2321) | 1 | 150, 10 |
| 6 | 0.231 | 0.42 | Yes | 2 | Fluorosilicone (FL 60-9201) | 1 | 200, 5 |
| 7 | 0.561 | 0.55 | Yes | 2 | Fluorosilicone (FL 60-9201) | 1 | 200, 5 |
| 8 | 0.561 | 0.55 | No | 4 | Fluorosilicone (FL 60-9201) | 1 | 200, 5 |
| 9 | 0.231 | 0.42 | No | 4 | Fluorosilicone (FL 60-9201) | 1 | 200, 5 |
| 10 | 0.231 | 0.42 | Yes | 2 | Silicone (SS-2321) | 1 | 150, 10 |
| 11 | 0.561 | 0.55 | Yes | 2 | Silicone (SS-2321) | 1 | 150, 10 |
| 12 | 0.231 | 0.42 | No | 2 | Fluorosilicone (FL 60-9201) | 1 | 200, 5 |
| 13 | 0.561 | 0.55 | No | 2 | Fluorosilicone (FL 60-9201) | 1 | 200, 5 |
| 14 | 0.367 | 0.08 | No | 4 | Silicone (SS-2321) | 1 | 150, 10 |
| 15 | 0.367 | 0.08 | No | 2 | Silicone (SS-2321) | 1 | 150, 10 |

TABLE 1-continued

| Raw materials and processing used in all examples: | | | | | | | |
|---|---|---|---|---|---|---|---|
| Example # | ePTFE Thickness (mm) | ePTFE Density (g/cm3) | Barrier Layer | # of Coats | Elastomer | Emboss Geometry ID | Oven Cycle (° C., mins) |
| 16 | 0.561 | 0.55 | Yes | 2 | Perfluoropolyether (Sifel 2618) | 1 | 100, 10 |
| 17 | 0.561 | 0.55 | No | 4 | Perfluoropolyether (Sifel 2618) | 1 | 100, 10 |
| 18 | 0.231 | 0.42 | Yes | 2 | Perfluoropolyether (Sifel 2618) | 1 | 100, 10 |
| 19 | 0.231 | 0.42 | No | 4 | Perfluoropolyether (Sifel 2618) | 1 | 100, 10 |
| 20 | 0.367 | 0.08 | No | 4 | Silicone (SS-2321) | 2 | 150, 10 |
| 21 | 0.367 | 0.08 | No | 2 | Silicone (SS-2321) | 2 | 150, 10 |
| 22 | 0.561 | 0.55 | No | 2 | Silicone (SS-2321) | 1 | 150, 10 |
| 23 | 0.231 | 0.42 | No | 2 | Silicone (SS-2321) | 1 | 150, 10 |
| 24 | 0.104 | 0.04 | No | 2 | Silicone (SS-2321) | 1 | 150, 10 |
| 25 | 0.104 | 0.04 | No | 4 | Silicone (SS-2321) | 1 | 150, 10 |
| 26 | 0.367 | 0.08 | Yes | 2 | Perfluoropolyether (Sifel 2618) | 1 | 100, 10 |
| 27 | 0.367 | 0.08 | No | 4 | Perfluoropolyether (Sifel 2618) | 1 | 100, 10 |
| 28 | 0.561 | 0.55 | Yes | 2 | Silicone (SS-2321) | 1 | 150, 10 |
| 29 | 0.231 | 0.42 | Yes | 2 | Silicone (SS-2321) | 1 | 150, 10 |
| 30 | 0.104 | 0.04 | Yes | 2 | Silicone (SS-2321) | 1 | 150, 10 |
| 31 | 0.561 | 0.55 | No | 4 | Silicone (SS-2321) | 1 | 150, 10 |
| 32 | 0.561 | 0.55 | No | 4 | Silicone (SS-2321) | 2 | 150, 10 |
| 33 | 0.231 | 0.42 | No | 4 | Silicone (SS-2321) | 1 | 150, 10 |
| 34 | 0.561 | 0.55 | Yes | 2 | Perfluoropolyether (Sifel 2618) | 1 | 100, 10 |
| 35 | 0.231 | 0.42 | Yes | 2 | Perfluoropolyether (Sifel 2618) | 1 | 100, 10 |
| 36 | 0.367 | 0.08 | Yes | 2 | Perfluoropolyether (Sifel 2618) | 1 | 100, 10 |
| 37 | 0.561 | 0.55 | No | 4 | Perfluoropolyether (Sifel 2618) | 1 | 100, 10 |

Table 2 refers to structural characteristics of each respective example of Examples 1-37 discussed above. Example thicknesses and densities were obtained at a standard applied pressure of approximately 0.3 MPa, and % compression information at about 1 MPa, about 16 MPa and about 60 MPa.

TABLE 2

| Thickness, density, and compression data selectively densified composite examples: | | | | | |
|---|---|---|---|---|---|
| Example # | Thickness (mm) | Density (g/cm3) | % Compression @1 MPa | % Compression @16 MPa | % Compression @60 MPa |
| 1 | 0.3993 | 1.27 | 10.49 | 34.65 | 50.7 |
| 2 | 0.4114 | 1.38 | 3.6 | 23.89 | 46.2 |
| 3 | 0.5662 | 1.16 | 6.62 | 40.22 | 61.1 |
| 4 | 0.4915 | 1.05 | 9.56 | 39.13 | 54.2 |
| 5 | 0.2115 | 1.08 | 2.46 | 45.68 | 70.9 |
| 6 | 0.4297 | 1.34 | 1.92 | 31.45 | 63 |
| 7 | 0.7246 | 1.4 | 2.3 | 30.95 | 55.8 |
| 8 | 0.9899 | 1.4 | 2 | 35.91 | 67.2 |
| 9 | 0.7783 | 1.37 | 3.35 | 53.7 | 77.4 |

TABLE 2-continued

| Thickness, density, and compression data selectively densified composite examples: | | | | | |
|---|---|---|---|---|---|
| Example # | Thickness (mm) | Density (g/cm3) | % Compression @1 MPa | % Compression @16 MPa | % Compression @60 MPa |
| 10 | 0.0837 | 1.47 | 2.14 | 14.54 | 30.8 |
| 11 | 0.3419 | 1.48 | 2.8 | 25.42 | 43.5 |
| 12 | 0.5162 | 1.3 | 3.44 | 43.3 | 69.7 |
| 13 | 0.6248 | 1.32 | 3.03 | 30.6 | 54.9 |
| 14 | 0.1972 | 1.01 | 5.72 | 60.37 | 79.7 |
| 15 | 0.1411 | 1.04 | 8.53 | 48.19 | 72 |
| 16 | 0.4076 | 1.48 | 5.52 | 21.8 | 41.6 |
| 17 | 0.4714 | 1.77 | 5.89 | 27.23 | 48.6 |
| 18 | 0.0989 | 1.46 | 4 | 23.47 | 38.3 |
| 19 | 0.1971 | 1.55 | 7.52 | 36.7 | 67.5 |
| 20 | 0.2877 | 0.83 | 15.27 | 69.02 | 84 |
| 21 | 0.1687 | 0.87 | 11.26 | 59.2 | 79.4 |
| 22 | 0.4427 | 1.32 | 10.6 | 31.22 | 51.6 |
| 23 | 0.1882 | 1.04 | 4.15 | 37.96 | 59.6 |
| 24 | 0.0971 | 1.15 | 2.93 | 52.44 | 81.6 |
| 25 | 0.0789 | 1.17 | 0.92 | 75.15 | 75.2 |
| 26 | 0.0523 | 1.3 | 7.23 | 28.45 | 38.8 |

TABLE 2-continued

Thickness, density, and compression data selectively densified composite examples:

| Example # | Thick-ness (mm) | Density (g/cm3) | % Compression @1 MPa | % Compression @16 MPa | % Compression @60 MPa |
|---|---|---|---|---|---|
| 27 | 0.1609 | 1.57 | 6.62 | 20.05 | 61.1 |
| 28 | 0.4915 | 1.37 | 5 | 32.89 | 52.6 |
| 29 | 0.085 | 1.53 | 2.4 | 16.14 | 32.7 |
| 30 | 0.043 | 1.25 | 6.04 | 21.42 | 38.5 |
| 31 | 0.5545 | 1.34 | 1.55 | 35 | 60.1 |
| 32 | 0.5395 | 1.08 | 10.34 | 40 | 57.1 |
| 33 | 0.1835 | 1.07 | 2.19 | 35.27 | 57.3 |
| 34 | 0.42 | 1.52 | 6.26 | 21.89 | 42.2 |
| 35 | 0.1325 | 1.29 | 9.41 | 25.09 | 37.1 |
| 36 | 0.1533 | 1.29 | 5.41 | 29.9 | 43.4 |
| 37 | 0.4797 | 1.83 | 2.97 | 15.27 | 39 |

As shown in Table 2, the example selectively densified composite sealants varied in thickness from about 43 μm up to about 1.00 mm, and tolerated compression strains from about 1% to 15% (at 1 MPa), or from about 14% to 75% (at 16 MPa), or from about 30% to about 84% (at 60 MPa), indicating a very high degree of compressibility of the example selectively densified composite sealants and the ability to adjust compressibility with material composition.

Table 3 refers to hysteresis values for strain recovery for select samples, including percent strain energy maintained and percent compression set after compression. The % strain energy retained is a measure of how much return force the composite imparts while recovering compared to the amount used to initially deform the composite, and is calculated based on the area under a stress-strain curve obtained while unloading the sample, compared to the area under a stress-strain curve obtained while loading the sample. Specifically, the % strain energy retained can be defined as the strain energy measured while unloading the sample (after deformation), divided by the strain energy measured while initially loading the sample. Compression set is a measure of the instantaneous compression upon unloading of a sample after an applied strain, and is measured by the Hysteresis test method described above.

TABLE 3

Stress retention and hysteresis:

| Example # | % Stress Retained (5 mins) | Hysteresis Curve: % Strain Energy Maintained | Hysteresis Curve: % Compression Set (strain at 0 Pa, unloading) |
|---|---|---|---|
| 3 | 48 | 23 | 87 |
| 8 | 73 | 26 | 25 |
| 19 | 55 | 50 | 25 |

As shown in Table 3, the example selectively densified composite sealants of examples 8 and 19 exhibit good compression set behavior while exhibiting excellent compressive range, achieving 75% recovery after compression, with compression sets around 25% (based on the % of strain applied). The high stress energy retained, as shown by the examples, suggest that they would make good dynamic seals because they recover well (as indicated by the low compression set), while also maintaining good return force (necessary for sealing) during that recovery. The stress retained metric provides an indication of the seal integrity over time, in particular for static joints. The combination of both the compression set and strain energy maintained suggest a good dynamic sealing capability maintained by the example selectively densified composite sealants, which indicates that the sealants would maintain good seal integrity over time. The combination of good parameters for stress retained, compression set, and strain energy maintained suggests seal integrity over time for a dynamic joint.

The second column of Table 3 shows the percent stress retained in the samples after a relaxation period of five minutes during a constant strain of 25%. This value was obtained by measuring the modulus of each sample both immediately upon application of peak strain, and at a time period after, and dividing the modulus at 5 minutes past the peak strain by the modulus at the time of peak strain. As shown in Table 3, the example selectively densified composite sealants typically retained a high percentage of return force during constant compression, as indicated by stress retention ratios on the order of 48% to 73%. This retention of return force is very important for fastened assemblies and, for example, could relate to higher retained torque on bolts and higher retained compression pressure on rivets over time.

The selectively densified composite sealants disclosed herein allow for far greater compressibility that a pure elastomer, but can still obtain good performance on stress retention and recoverability while preventing liquid ingress. Selectively densified composite sealants similar to Example 8 have particularly improved properties. FIG. 10 clearly exemplifies the fluid ingress prevention obtained by selectively densified composite sealants of the present disclosure.

The invention has now been described in detail for the purposes of clarity and understanding. However, those skilled in the art will appreciate that certain changes and modifications may be practiced within the scope of the appended claims.

In the preceding description, for the purposes of explanation, numerous details have been set forth in order to provide an understanding of various embodiments of the present disclosure. It will be apparent to one skilled in the art, however, that certain embodiments may be practiced without some of these details, or with additional details. Further, specific materials and material properties as described with reference to one embodiment (e.g., material densities, porosities, thicknesses, alternative materials, etc.) may be combined or used in place of materials described in other embodiments except where explicitly contraindicated.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present disclosure. Accordingly, the above description should not be taken as limiting the scope of the present disclosure or claims.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the present disclosure, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

What is claimed is:

1. A selectively densified composite sealant, comprising:

a porous layer having a first major surface and an opposing second major surface, the porous layer comprising a porous membrane and having alternating densified portions and undensified portions, the densified and undensified portions forming respective valleys and peaks in at least one of the first and second major surfaces of the porous layer;

at least one elastomeric layer disposed on one or both of the first and second major surfaces, the at least one elastomeric layer comprising an elastomeric material that fills the valleys in the first and/or second major surfaces of the porous layer, wherein the undensified portions are disconnected from each other and separated by the densified portions; and wherein the at least one elastomeric layer comprises a first elastomeric layer disposed on the first major surface, the first elastomeric layer comprising a first elastomeric material that fills the valleys in the first major surface and a second elastomeric layer disposed on the second major surface, the second elastomeric layer comprising a second elastomeric material that fills the valleys in the second major surface.

2. The sealant of claim 1, wherein the first and second elastomeric material are different elastomeric materials or wherein the first and second elastomeric materials are the same elastomeric material.

3. The sealant of claim 1, wherein the porous membrane comprises expanded polytetrafluoroethylene (ePTFE).

4. The sealant of claim 1, wherein the elastomeric material comprises a fluoroelastomer.

5. The sealant of claim 1, further comprising at least one barrier layer disposed between the porous layer and the at least one elastomeric layer.

6. The sealant of claim 5, wherein the porous layer is free from the elastomeric material from the at least one elastomeric layer.

7. The sealant of claim 6, wherein the barrier layer is selected from the group comprising densified expanded polytetrafluoroethylene (ePTFE) and biaxially oriented polypropylene (BOPP).

8. The sealant of claim 1, wherein the elastomeric material is partially imbibed into the undensified portions.

9. The sealant of claim 1, wherein the undensified portions have substantial remaining porosity.

10. The sealant of claim 1, wherein the porous layer comprises a repeating pattern of the undensified portions and densified portions.

11. The sealant of claim 10, wherein the repeating pattern comprises undensified portions arranged in a rectangular grid and separated from one another by the densified portions.

12. The sealant of claim 1, wherein the densified portions comprise a grid of compressed ePTFE having a density from 0.66 $g/cm^3$ to 2.20 $g/cm^3$.

13. The sealant of claim 1, wherein the densified portions comprise a grid of compressed ePTFE compressed to a pressure from about 12 to at least 60 MPa.

14. The sealant of claim 1, wherein the densified portions comprise a grid of compressed ePTFE, the grid having a grid line width from 0.25 to 5.00 mm.

15. The sealant of claim 1, wherein the densified portions comprise a grid of compressed ePTFE, the grid having a grid line spacing from 1 mm to 10 mm.

16. The sealant of claim 1, wherein the sealant has a total thickness from 10 to 3000 μm.

17. The sealant of claim 1, wherein the sealant compresses to a strain of 10 to 90% or 30 to 70% under stress of 60 MPa.

18. The sealant of claim 1, wherein the sealant is structurally sound at a range of temperatures from −50° C. to at least 100° C.

19. The sealant of claim 1, wherein the at least one elastomeric layer comprises a first elastomeric layer disposed on the first major surface, the first elastomeric layer comprising a first elastomeric material that fills the valleys in the first major surface and;

a second elastomeric layer disposed on the second major surface, the second elastomeric layer comprising a second elastomeric material that fills the valleys in the second major surface, and wherein the first elastomeric material and/or the second elastomeric material comprises a plurality of elastomeric layers.

20. The sealant of claim 1, wherein the densified portions of the porous layer and the elastomeric material of the elastomeric layer are liquid impermeable.

21. The sealant of claim 1, wherein the densified portions of the porous layer are configured to prevent liquid ingress into the sealant and thus are configured to render a mechanical connection comprising the sealant liquid tight.

22. The sealant of claim 1, wherein the densified portions of the porous layer and the elastomeric material of the elastomeric layer are resistant to chemical attack by jet fuel and phosphate ester hydraulic fluid.

23. The sealant of claim 1 wherein the valleys formed above the densified regions are filled with the elastomeric layer covering the non-densified regions more narrowly to form smooth top and bottom surfaces of the composite.

24. A method of forming a selectively densified composite sealant, the method comprising:

providing a porous layer having a first major surface and an opposing second major surface;

compressing the first major surface of the porous layer in a pattern to form a partially densified porous layer, the partially densified porous layer comprising alternating densified portions and undensified portions forming respective valleys and peaks in the porous layer wherein the undensified portions are disconnected from each other and separated by the densified portions;

coating the first major surface with a first elastomeric material to form a first elastomeric layer disposed on the first major surface, the first elastomeric layer comprising the first elastomeric material covering the densified and undensified portions;

curing the first elastomeric layer to form the composite sealant; and compressing the second major surface of the porous layer in a pattern to form a partially densified porous layer, the partially densified porous layer comprising a densified portions and undensified portions forming respective valleys and peaks in the porous layer wherein the undensified portions are disconnected from each other and separated by the densified portions, optionally wherein the second compression step is performed before the coating step of the first major surface with elastomeric material.

25. The method of claim 24, further comprising:

coating the second major surface with a second elastomeric material, optionally the same as the first elastomeric material, to form a second elastomeric layer disposed on the second major surface, the second elastomeric layer comprising the second elastomeric material covering the densified and undensified portions.

26. The method of claim 24, wherein the first major surface is coated with the first elastomeric material without imbibing the first elastomeric material into the undensified regions.

27. The method of claim 24, further comprising:

coating the first and/or second elastomeric material with an additional elastomeric material.

28. The method of claim 24, comprising heating the composite comprising a coated elastomeric material to at least partially cure the elastomeric material.

29. The method of claim 24, comprising:

at least partially curing the elastomer(s) by heating the composite at a temperature of from about 100° C. to about 200° C. for about 5 to about 10 minutes.

30. The method of claim 29, further comprising:

further curing the sealant at a temperature of from about 100° C. to about 200° C. for at least 5 minutes.

31. The method of claim 24, further comprising:

applying a barrier layer material on a first and/or a second major surface of the porous layer prior to the compression step to form a barrier layer to inhibit ingress of the elastomeric material into the partially densified porous layer, optionally wherein this step is a thermal lamination step.

32. The method of claim 24, further comprising applying adhesive an outer surface of the first elastomeric material and/or on an outer surface of the second elastomeric material.

33. The method of claim 32, wherein the adhesive is applied discontinuously, optionally wherein the adhesive is applied as discrete dots; or wherein the adhesive is applied as a continuous layer.

34. The method of claim 24 wherein the valleys formed above the densified regions are filled with the elastomer layer which more narrowly covers the non-densified regions to form smooth upper and lower surfaces of the composite.

* * * * *